(12) United States Patent
Bae

(10) Patent No.: US 6,839,500 B2
(45) Date of Patent: Jan. 4, 2005

(54) APPARATUS FOR IMPLEMENTING STILL FUNCTION OF DVD AND METHOD THEREOF

(75) Inventor: Sung Ok Bae, Euiwang (KR)

(73) Assignee: LG Electronics Inc., Seoul (KR)

(*) Notice: Subject to any disclaimer, the term of this patent is extended or adjusted under 35 U.S.C. 154(b) by 864 days.

(21) Appl. No.: 09/750,502

(22) Filed: Dec. 29, 2000

(65) Prior Publication Data

US 2001/0006577 A1 Jul. 5, 2001

(30) Foreign Application Priority Data

Dec. 30, 1999 (KR) .......................................... 1999-66203

(51) Int. Cl.[7] .............................. H04N 5/91; H04N 5/21
(52) U.S. Cl. ............................ 386/68; 386/70; 386/80; 386/82; 386/121; 386/46; 348/607
(58) Field of Search .......................... 386/68, 70, 49, 386/51, 66, 80, 82, 87, 124, 121, 113, 21, 46; 348/607; 360/74

(56) References Cited

U.S. PATENT DOCUMENTS

2003/0133368 A1 * 7/2003 Gotoh et al. .............. 369/13.56
2003/0182002 A1 * 9/2003 Higaki et al. .................. 700/94

FOREIGN PATENT DOCUMENTS

JP 07-177459 7/1995

* cited by examiner

Primary Examiner—Thai Tran
Assistant Examiner—Jamie Jo Vent
(74) Attorney, Agent, or Firm—Fleshner & Kim, LLP

(57) ABSTRACT

An apparatus and method for implementing a still function of a DVD are provided. According to the apparatus and method of the present invention, a still frame is accurately implemented by detecting a frame to be stilled at a system level and processing it internally without help of any external host computer. In the manner according to the present invention, a still function can be quickly processed and a still frame can be displayed at the exact time required.

16 Claims, 3 Drawing Sheets

APPARATUS FOR IMPLEMENTING STILL FUNCTION OF DVD AND METHOD THEREOF

BACKGROUND OF THE INVENTION

1. Field of the Invention

The present invention relates to a technique for implementing a still function of a DVD, and more particularly to an apparatus and a method for accurately implementing a still function of a DVD.

2. Description of the Background Art

FIG. 1 is a schematic block diagram of an apparatus for implementing a still function of a DVD in accordance with a conventional art.

As shown in the drawing, the apparatus for implementing a still function of a DVD of a conventional art includes a system decoder 2 for receiving a data (VOBU) outputted from a DVD reproducing unit 1, decoding it to output A/V bit streams (A/V_EL_ST), and extracting presentation time stamps (PTS); a bit stream buffer 3 for receiving the A/V bit streams from the system decoder 2 and buffering it; an A/V decoder 4 for receiving and decoding the A/V bit streams (A/V_EL_ST) from the bit stream buffer 3, and displaying it according to the presentation time stamps (PTS); and a host computer 5 for receiving an inherent number (A/V_PCK_LBN) of the A/V bit streams (A/V_EL_ST), comparing the inherent number of the A/V bit streams (A/V_EL_ST) with an inherent still frame number (Still_VO_LBN) of a navigation data outputted from the DVD reproducing unit 1, and controlling the A/V bit streams output of the system decoder 2 according to the comparison result.

The operation of the apparatus for implementing a still function of a DVD of the conventional art constructed as described above will now be explained with reference to the accompanying drawings.

First, the system decoder 2 receives the data (VOBU) reproduced and outputted from the DVD reproducing unit 1, decodes the data (VOBU) and stores the A/V bit streams (A/V_EL_ST) in the bit stream buffer 3. In addition, the system decoder 2 extracts the presentation time stamps (PTS) of each video frame from the data (VOBU) reproduced and outputted from the DVD reproducing unit 1 and transmits it to the A/V decoder 4.

When the A/V bit streams (A/V_EL_ST) stored after being received from the system decoder 2 grows to a size of one frame, the bit stream buffer 3 transmits it to the A/V decoder 4.

Then, the A/V decoder 4 receives the A/V bit streams (A/V_EL_ST) from the bit stream buffer 3, decodes and restore it into its original A/V data. And the A/V decoder 4 also displays the restored A/V data on a screen according to the presentation time stamps inputted from the system decoder 2.

When the inherent still frame number (Still_VO_LBN) of the navigation data is outputted from the DVD reproducing unit 1, the host computer 5 compares the inherent still frame number (Still_VO_LBN) with the inherent number (A/V_PCK_LBN) of the A/V bit streams (A/V_EL_ST) inputted from the system decoder 2.

Upon comparison, if the inherent number (Still_VO_LBN) of the still frame and the inherent number (A/V_PCK_LBN) of the A/V bit streams (A/V_EL_ST) are identical to each other, the host computer 5 controls the output of the system decoder 2. Under the control of the host computer 5, the A/V bit streams (A/V_EL_ST) corresponding to the video frame to be stilled is stored in the bit stream buffer 3.

Thereafter, when the A/V decoder 4 receives the video frame to be stilled from the bit stream buffer 3 and decodes it, the bit stream buffer 3 is turned to an underflow state, according to which the A/V decoder 4 displays the lastly decoded frame.

In other word, the apparatus for implementing a still function of a DVD in accordance with the conventional art provides a still frame by utilizing a function of most MPEG decoders that when an underflow occurs in the bit stream buffer 3, a frame just prior to the underflow is stopped and displayed.

Generally, in case of a finite still, a still time is defined between 0~244 ms. Thus, in order to implement a still function accurately, the time point when a command on the still is inputted from an external source must be accurately recognized.

However, in the conventional apparatus for implementing a still function of a DVD by utilizing the underflow of the bit stream buffer, there is a possibility that a frame to be stilled is not stilled due to a delay in the decoding and displaying operation of the A/V decoder. And thus it may cause a problem that a stability of the system is degraded.

In addition, in the conventional apparatus for implementing a still function of a DVD, a delay time that data buffered in the bit stream buffer is displayed is different depending on the internal structure of the A/V decoder, Accordingly, it is difficult to detect at what time point the still occurs.

Therefore, in order to solve the problem, the conventional apparatus for implementing a still function of a DVD, the periodically reads the presentation time stamp of the video frame being displayed after all A/V bit streams of a frame including still information are applied to the system decoder. And the host computer compares the presentation time stamp extracted by the system decoder with the presentation time stamp of the video frame to be stilled and judges whether the currently displayed video frame is a video frame to be stilled.

However, it still has a problem that the A/V decoder should repeatedly perform the comparing operation between the presentation time stamps of the video frame to be stilled and the presentation time stamp of the currently displayed video frame until the frame to be stilled is displayed.

SUMMARY OF THE INVENTION

It is an object of the present invention to provide a novel apparatus and method for accurately implementing a still function of a DVD, wherein a frame to be stilled is detected at a system level and internally processed without any help of external host computer, thereby a still function can be quickly processed and a still frame can be displayed at the exact time required.

To achieve these and other advantages and in accordance with the purpose of the present invention, as embodied and broadly described herein, there is provided an apparatus for implementing a still function of a DVD including: a system decoder for receiving a data outputted from a DVD reproducing unit, decoding it and outputting A/V bit streams; a still detecting unit for detecting an inherent number of the A/V bit streams outputted from the system decoder, comparing it with an inherent number of a still frame outputted from a host computer, and outputting a still detect signal; a still processing unit for receiving the still detect signal from the still detecting unit and outputting a still flag to control a still time point; a bit stream buffer for receiving the A/V bit streams from the system decoder and buffering it; and an A/V decoder for being switched to a still mode by the still flag outputted from the still processing unit, decoding the A/V bit streams read by the bit stream buffer and displaying a still frame.

To achieve the above objects, there is also provided a method for implementing a still function of a DVD including the steps of: extracting an inherent number of a still frame and an inherent number of A/V bit streams and storing them; and comparing the inherent number of the still frame and the inherent number of the A/V bit streams, and performing the still function if the inherent number of the still frame and the inherent number of the A/V bit streams are identical.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
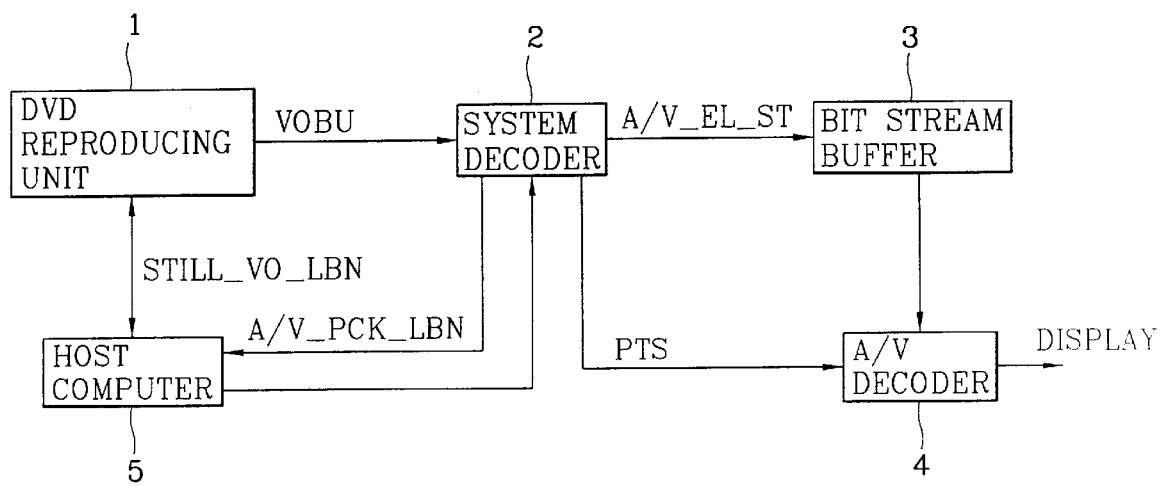
FIG. 1 is a schematic block diagram of an apparatus for implementing a still function of a DVD in accordance with a conventional art.
Figure 2:
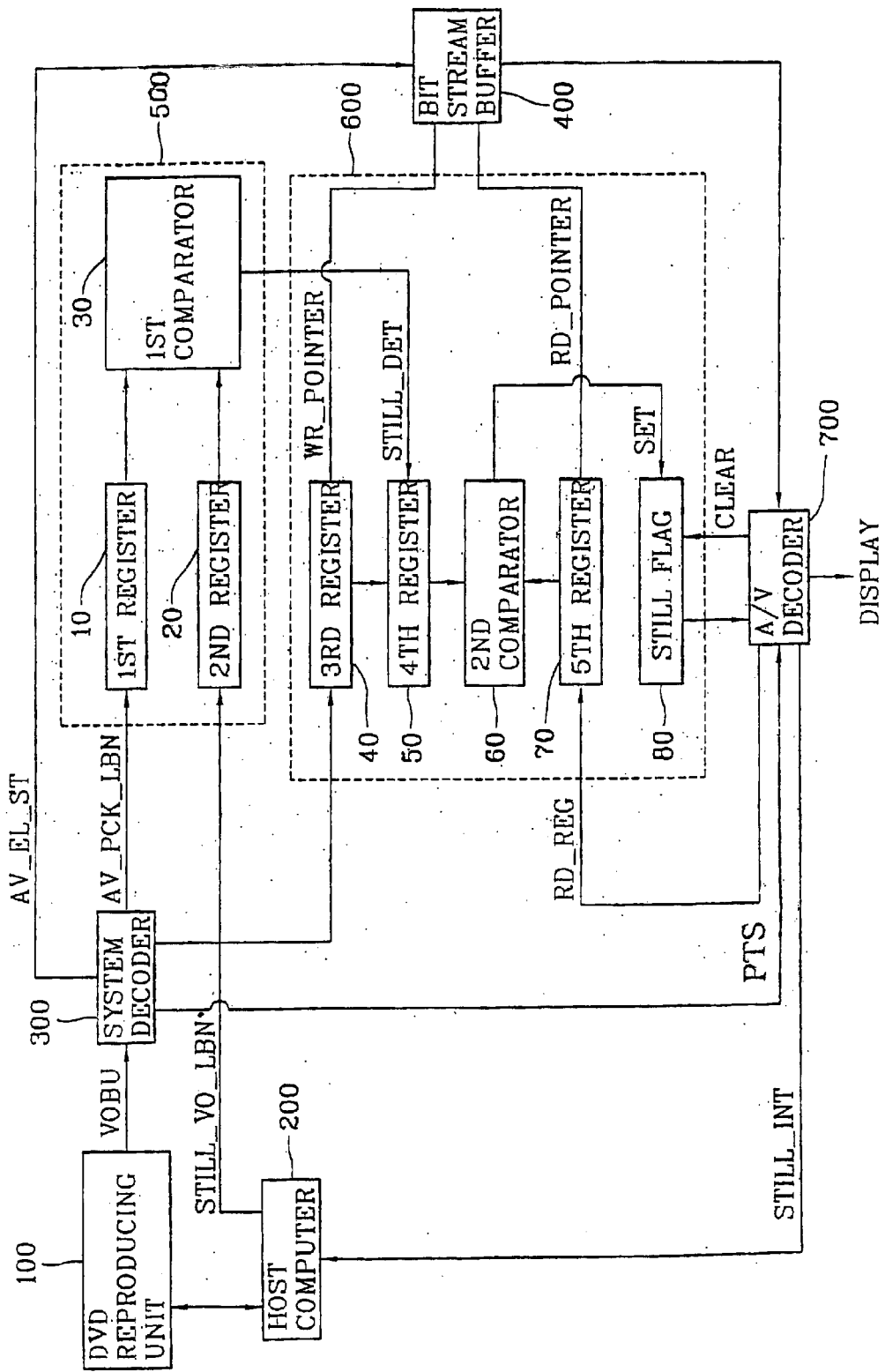
FIG. 2 is a schematic block diagram of an apparatus for implementing a still function of a DVD in accordance with the present invention.

FIG. 2 is a schematic block diagram of an apparatus for implementing a still function of a DVD in accordance with the present invention.

As shown in the drawing, an apparatus for implementing a still function of a DVD of the present invention includes a DVD reproducing unit 100, a host computer 200, a system decoder 300, a bit stream buffer 400, a still detecting unit 500, a still processing unit 600 and an A/V decoder 700.

The still detecting unit 500 includes a first Register 10 for receiving an inherent number (A/V_PCK_LBN) of A/V bit streams (A/V_EL_ST) from the system decoder 300 and storing it; a second Register 20 for receiving an inherent number (Still_VO_LBN) of a still frame from the host computer 200; and a first comparator for reading the inherent number (A/V_PCK_LBN) of the A/V bit streams (A/V_EL_ST) stored in the first Register 10 and the inherent number (Still_VO_LBN) of the still frame stored in the second Register 20, comparing them, and outputting a still detect signal (Still_DET) if the two numbers are identical to each other upon comparison.

The still processing unit 600 includes a third Register 40 for receiving a write request signal (WR_REQ) from the system decoder 300 and outputting a write pointer signal (WR_Pointer); a fourth Register 50 for receiving a write pointer signal (WR_Pointer) at a time point when the still detect signal (Still_DET) is inputted from the still detecting unit 500, from the third Register 40 and storing it; a fifth Register 70 for receiving a read request signal (RD_REQ) from the A/V decoder 700 and outputting a read pointer signal (RD_Pointer); and a second comparator 60 for receiving the read pointer signal (RD_Pointer) of the fifth Register 70 and the write pointer signal (WR_Pointer) of the fourth Register 50, comparing them, and setting a still flag 80 if the read pointer signal (RD_Pointer) is equal to or greater than the write pointer signal (WR_Pointer), upon comparison.

The apparatus for implementing a still function of a DVD in accordance with the present invention constructed as described above will now be explained with reference to the accompanying drawings.

First, the host computer 200 extracts a still frame inherent number (Still_VO_LBN) of a navigation data outputted after being reproduced by the DVD reproducing unit 100 and outputs the extracted still frame inherent number (Still_VO_LBN) to the still detecting unit 500.

The system decoder 300 receives the data (VOBU) reproduced and outputted from the DVD reproducing unit 100, decodes it and outputs the A/V bit streams (A/V_EL_ST), under the control of the host computer 200.

In addition, in order to store the A/V bit streams (A/V_EL_ST) in the bit stream buffer 400, the system decoder 300 outputs a write request signal (WR_REQ) to the bit stream buffer 400 whenever the A/V bit streams is outputted by frame, and outputs presentation time stamps (PTS) to display the frame.

At this time, the still detecting unit 500 receives the inherent number (A/V_PCK_LBN) of the A/V bit streams (A/V_EL_ST) from the system decoder 300, compares the inherent number (A/V_PCK_LBN) of the A/V bit streams (A/V_EL_ST) with the still frame inherent number (Still VO_LBN) outputted from the host computer 200, and outputs a still detect signal (Still_DET) if the two numbers are identical to each other upon comparison.

That is, the second Register 20 of the still detecting unit 500 stores the still inherent number (Still VO_LBN) outputted from the host computer 200, and the first Register 10 stores the inherent number (A/V_PCK_LBN) of the A/V bit streams (A/V_EL_ST) outputted after being decoded by the system decoder 300.

And then, the first comparator 30 compares the inherent number (Still_VO_LBN) of the still frame stored in the second Register 20 and the inherent number (A/V_PCK_LBN) of the A/V bit streams (A/B_EL_ST) stored in the first register 10, and then, if the two inherent numbers are identical to each other upon comparison, the first comparator 30 outputs the still detect signal (Still_DET).

Thereafter, when the still detect signal (Still_DET) is inputted from the first comparator 30 of the still detecting unit 500 to the fourth Register 50 of the still processing unit 600, the fourth Register 50 stores the write pointer signal (WR_Pointer) outputted from the third Register 40 at the time point of receiving the still detect signal (Still_DET).

And, the second comparator 60 compares the write pointer (WR_Pointer) stored in the fourth Register 50 with the read pointer (RD_Pointer) stored in the fifth Register 70. Upon comparison, if the read pointer (RD_Pointer) is equal to or greater than the address assigned by the write pointer signal (WR_Pointer), the second comparator 60 sets the still flag 80.

Meanwhile, the third Register 40 of the still processing unit 600 receives the write request signal (WR_REQ) from the system decoder 300 and outputs the write pointer (WR_Pointer) of the bit stream buffer 400 at which the A/V bit streams (A/V_EL_ST) is to be written.

The fifth Register 70 of the still processing unit 600 receives the read request signal (RD_REQ) from the A/V decoder whenever the AV decoder 700 displays the A/V bit streams by frame, and outputs the read pointer (RD_Pointer) of the bit stream buffer 400 at which the A/V bit streams (A/V_EL_ST) is to be read.

The write pointer (WR_Pointer) and the read pointer (RD_Pointer) are sequentially increased by the size of A/V bit stream unit written in or read out from the bit stream buffer 400.

At this time, in the bit stream buffer 400, the A/V bit streams (A/V_EL_ST) outputted from the system decoder 300 is written in the address region designated by the write pointer signal (WR_Pointer) outputted from the still processing unit 600, and the A/V bit streams (A/V_EL_ST) written after being inputted from the system decoder 300 is read by the A/V decoder 700 from the address region of the bit stream buffer 400 pointed by the read pointer signal (RD_Pointer) outputted from the still processing unit 600.

At this time, when the still flag 80 inputted from the still processing unit 600 is reset, the A/V decoder 700 decodes the A/V bit streams (A/V_EL_ST) read from the bit stream buffer 400 as a single frame, and outputs the decoded frame according to the presentation time stamps (PTS) inputted from the system decoder 300, so as to be displayed.

Meanwhile, if the still flag 80 inputted from the still processing unit 600 is set, the A/V decoder 700 is switched to a still mode and decodes the A/V bit streams read from the bit stream buffer 400.

And, when the decoded A/V bit streams makes a single frame, the A/V decoder 700 processes it to be still and clears the still flag 80, and at the same time, it outputs a still interrupt signal (Still_Int) to the host computer 200 to inform of the starting of the video still function. And then, the A/V decoder 700 is switched to a standby mode, waiting for a command from the host computer 200.

After the A/V decoder 700 is switched to a still mode, when a sequence end code (Sequence_End_Code) is detected from the bit stream buffer 400, the A/V decoder 700 displays repeatedly the frame decoded just prior to detection of the sequence end code, thereby implementing a still function.

Figure 3:
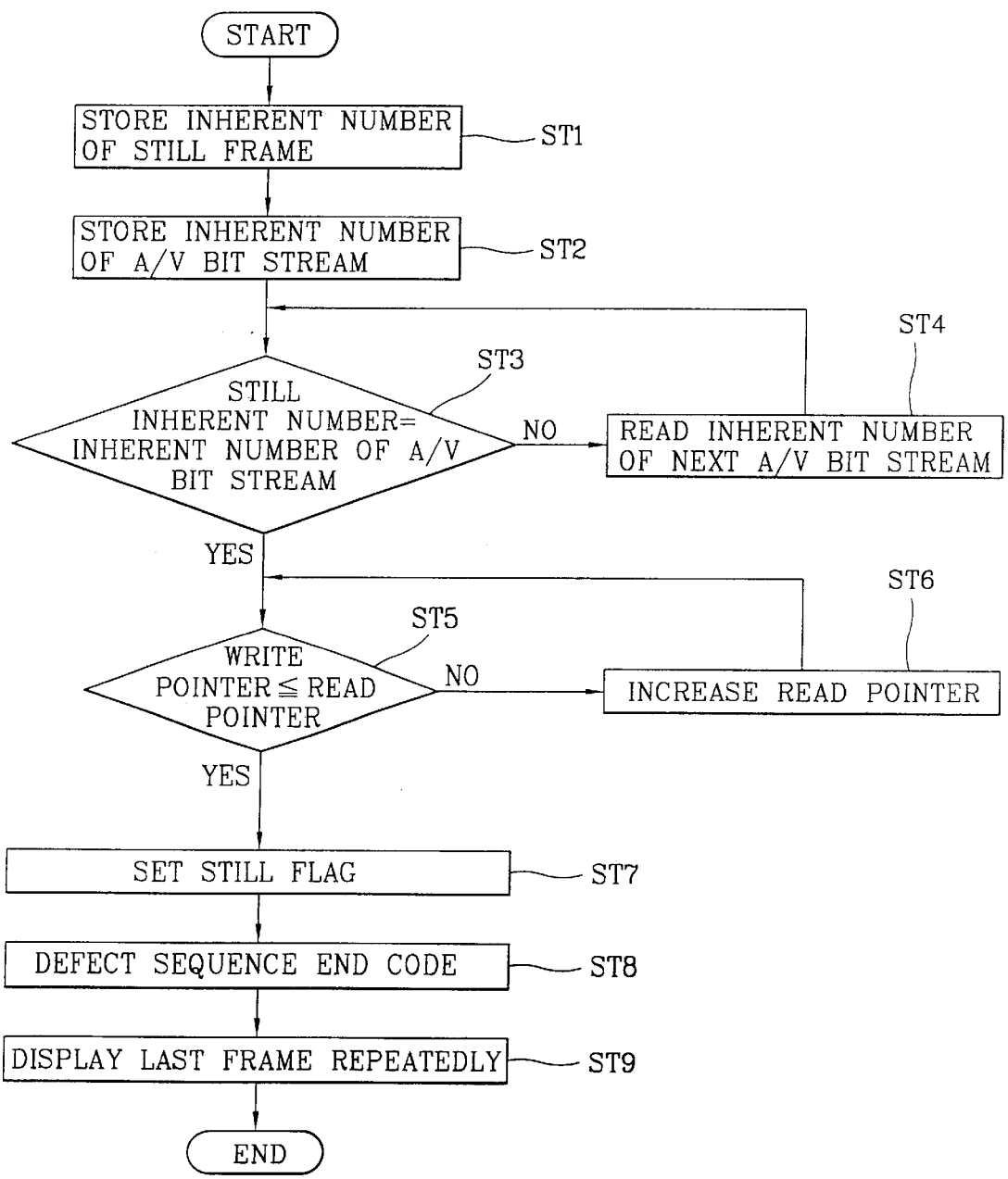
FIG. 3 is a flow chart of a method for implementing a still function of a DVD in accordance with the present invention.

FIG. 3 is a flow chart of a method for implementing a still function of a DVD in accordance with the present invention.

As shown in the drawing, first, the still frame inherent number (Still_VO_LBN) of the DVD and the inherent number (A/V_PCK_LBN) of the A/V bit streams (A/V_EL_ST) are stored (ST1)(ST2), and then the inherent number (Still_VO_LBN) of the still frame and the inherent number (A/V_PCK_LBN) of the A/V bit streams (A/V_EL_ST) are compared (ST3).

Upon comparison, if the inherent number of the still frame (Still_VO_LBN) and the inherent number (A/V_PCK_LBN) of the A/V bit streams (A/V_L_ST) are not identical to each other, whenever a new A/V bit streams (A/V_EL_ST) is inputted, the comparing operation is repeatedly performed until the inherent number (A/V_PCK_LBN) of the A/V bit streams (A/V_EL_ST) and the inherent number (Still_VO_LBN) of the still frame are identical to each other (ST4).

Meanwhile, in case that the inherent number of the still frame (Still_VO_LBN) and the inherent number (A/V_PCK LBN) of the A/V bit streams (A/V_EL_ST) are identical to each other, the write pointer signal (WR_Pointer) for assigning an address of the bit stream buffer 400 in which the A/V bit streams (A/V_EL_ST) are to be written at the time point when the two numbers are identical, is compared with the read pointer signal (RD_Pointer) for assigning an address region of the bit stream buffer 400 whenever the A/V bit streams (A/V_EL_ST) is read (ST4).

Upon comparison, in case that the write pointer signal (WR_Pointer) of the bit stream buffer 400 is greater than the read pointer signal (RD_Pointer), the comparing operation is repeatedly performed until the read pointer signal (RD_Pointer) is greater than or the same as the write pointer signal (WR_Pointer), whenever the read pointer signal (RD_Pointer) is changed. (ST6).

Meanwhile, if write pointer signal (WR_Pointer) of the bit stream buffer 400 is smaller than or equal to the read pointer signal (RD_Pointer), the still flag 80 is set (ST5) (ST7).

After the still flag 80 is set, when the sequence end code (Sequence_End_Code) is detected, the frame decoded just before the sequence end code (Sequence_End_Code) is detected is repeatedly displayed, thereby implementing a still function (ST8)(ST9).

As so far described, according the apparatus and method for implementing a still function of a DVD of the present invention, when a frame processed to be stilled is detected, the write pointer signal of the bit stream buffer at the time of detection of the still frame is stored.

And then, whenever the bit buffer is read, the write pointer signal is compared with the read pointer signal, so that when the read pointer signal is greater than or the same as the write pointer signal, the still flag is set and applied to the A/V decoder.

Then, the A/V decoder is switched to a still mode. While the A/V decoder is decoding the A/V bit streams upon receipt of it from the bit stream buffer, when the sequence end code is detected, the lastly decoded frame is repeatedly displayed, so that the still frame can be accurately and quickly displayed.

In addition, since it is not necessary to periodically read out the presentation time stamps from the A/V decoder to judge the time point when the still occurs, the time is less taken to process data, and the stability of the system is improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for implementing a still function of a DVD comprising:

a system decoder for receiving a data outputted from a DVD reproducing unit, decoding it and outputting A/V bit streams;

a still detecting unit for detecting an inherent number of the A/V bit streams outputted from the system decoder, comparing it with an inherent number of a still frame outputted from a host computer, and outputting a still detect signal;

a still processing unit for receiving the still detect signal from the still detecting unit and outputting a still flag to control a still time point;

a bit stream buffer for receiving the A/V bit streams from the system decoder and buffering it; and an A/V decoder for being switched to a still mode by the still flag outputted from the still processing unit, decoding the A/V bit streams read from the bit stream buffer and displaying a still frame wherein the still processing unit comprises a comparator for comparing a write pointer signal of the bit stream buffer that is generated at the identical time point with a read pointer signal is changed.

2. The apparatus according to claim 1, wherein the system decoder outputs a write request signal whenever the bit stream buffer outputs A/V bit streams.

3. The apparatus according to claim 1, wherein the A/V decoder outputs a read request signal whenever it decodes the A/V bit streams and displays it.

4. The apparatus according to claim 1, wherein the A/V decoder outputs a still interrupt signal to the host computer to inform the host computer of the displaying of the still frame.

5. The apparatus according to claim 1, wherein the A/V bit streams outputted from the system decoder is written in the address region of the bit stream buffer designated by the write pointer signal outputted from the still processing unit, and the A/V bit streams written by the system decoder is read by the A/V decoder from the address region of the bit stream buffer designated by the read pointer signal outputted from the still processing unit.

6. The apparatus according to claim 5, wherein the writer pointer signal is sequentially increased by an A/V bit stream unit.

7. The apparatus according to claim 5, wherein the read pointer signal is sequentially increased by an A/V bit stream unit.

8. The apparatus according to claim 1, wherein the still detecting unit includes a first Register for storing an inherent number of the A/V bit streams and a second Register for storing a still inherent number.

9. The apparatus according to claim 8, wherein the still detecting unit further comprises a first comparator for reading the inherent number of the A/V bit streams stored in the first Register and the still inherent number stored in the second Register and comparing them.

10. The apparatus according to claim 9, wherein the first comparator outputs a still detect signal, in case that the inherent number of the A/V bit streams and the inherent number of the still frame.

11. The still frame according to claim 8, wherein the still processing unit comprises:

a third Register for receiving a write request signal from the system decoder and outputting the write pointer signal;

a fourth Register for receiving a write pointer signal at the time point when the still detect signal is inputted from the still detecting unit, from the third Register and storing it; and a fifth Register for receiving a read request signal from the A/V decoder outputting the read pointer signal; and wherein the comparator for receiving the read pointer signal of the fifth Register and the write pointer signal of the fourth Register and compares them.

12. The apparatus according to claim 11, wherein the second comparator sets a still flag, if the read pointer signal of the fifth Register and the write pointer signal of the fourth Register are identical to each other or if the read pointer signal is greater than the write pointer signal.

13. A method for implementing a still function of a DVD comprising extracting an inherent number of a still frame and an inherent number of A/V bit streams and storing them;

comparing the inherent number of the still frame and the inherent number of the A/V bit streams; and processing the A/V bit streams if the inherent number of the still frame and the inherent number of the A/V bit streams are identical to each other wherein processing the still frame further comprises: comparing a write pointer signal of the bit stream buffer that is generated at the identical time point with a read pointer signal whenever the read pointer signal is changed.

14. The method according to claim 13, wherein processing the still frame further comprises:

repeatedly performing a comparing operation until the inherent number of the A/V bit streams and the still inherent number are identical to each other whenever A/V bit streams are newly inputted, in case that the inherent number of the still frame is not identical to the inherent number of the A/V bit streams.

15. The method according to claim 13, wherein processing the still frame further comprises:

setting a still flag if the write pointer signal of the bit stream buffer generated at the identical time point is smaller than or the same as the read pointer signal.

16. The method according to claim 15, wherein the step of setting the still flag further comprises: and repeatedly displaying a decoded frame just before a sequence end code is detected, in case that the sequence end code is detected after the still flag is set.

* * * * *